(12) United States Patent
Román

(10) Patent No.: US 8,744,135 B2
(45) Date of Patent: *Jun. 3, 2014

(54) METHODS AND DATA STRUCTURES FOR MULTIPLE COMBINED IMPROVED SEARCHABLE FORMATTED DOCUMENTS INCLUDING CITATION AND CORPUS GENERATION

(76) Inventor: Kendyl A. Román, Sunnyvale, CA (US)

(*) Notice: Subject to any disclaimer, the term of this patent is extended or adjusted under 35 U.S.C. 154(b) by 667 days.

This patent is subject to a terminal disclaimer.

(21) Appl. No.: 12/897,706

(22) Filed: Oct. 4, 2010

(65) Prior Publication Data

US 2011/0019915 A1    Jan. 27, 2011

Related U.S. Application Data

(63) Continuation-in-part of application No. 12/586,130, filed on Sep. 16, 2009, now Pat. No. 8,433,708.

(60) Provisional application No. 61/192,169, filed on Sep. 16, 2008.

(51) Int. Cl.
*G06K 9/62* (2006.01)

(52) U.S. Cl.
USPC ............................ 382/113; 382/187; 382/310

(58) Field of Classification Search
None
See application file for complete search history.

(56) References Cited

U.S. PATENT DOCUMENTS

| | | | |
|---|---|---|---|
| 8,170,289 B1* | 5/2012 | Feng et al. | 382/112 |
| 2003/0200505 A1* | 10/2003 | Evans | 715/507 |
| 2009/0138466 A1* | 5/2009 | Henry et al. | 707/5 |

* cited by examiner

*Primary Examiner* — Brian P Werner

(57) ABSTRACT

Searchable annotated formatted documents are produced by correlating documents stored as photographic or scanned graphic representations of an actual document (evidence, report, court order, etc.) with textual version of the same documents. A produced document will provide additional details in a data structure that supports citation annotation as well as other types of analysis of a document. The data structure also supports generation of citation reports and corpus reports. Methods of creating searchable annotated formatted documents including citation and corpus reports by correlating and correcting text files with photographic or scanned graphic of the original documents. Data structures for correlating and correcting text files with graphic images. Generation of citation reports, concordance reports, and corpus reports. Data structures for citation reports, concordance reports, and corpus reports generation. Multiple document data structures are used to create multiple citation documents and reports. Embodiments of citation reports and corpus reports contain correlated, comprehensive multiple citations.

20 Claims, 12 Drawing Sheets

Corpus for "Video" in
U.S. Patent 7,016,417

← 704    ← 702

| Prior Context | Word | Subsequent Context | Citation |
|---|---|---|---|
| General purpose compression for | video | Images (RHN) | '417 Patent Title |
| Methods, medium, and machines which compress, encode enhance, transmit, decompress, and display displayable | video | , categories of interest and the user's display preferences of each category. | '417 Abstract s.1 |
| 4. provides a scalable means of | video | compression. | '417 Patent 20:17 |

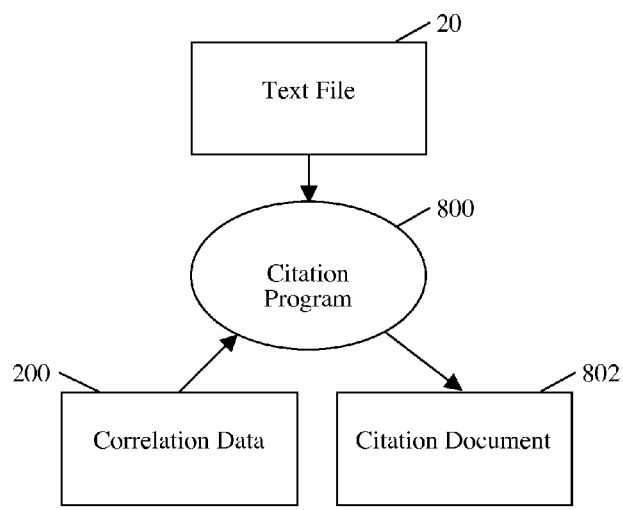

Fig. 8A

United States Patent 7,016,417 with Pat2Cite™ Citations

Summary
United States Patent 7,016,417, Roman; Kendyl A., entitled "General purpose compression for video images (RHN)," filed December 22, 1999, issued March 21, 2006, (the "'417 Patent")

Title
General purpose compression for video images (RHN) ('417 Title)

Abstract
Methods, medium, and machines which compress, encode, enhance, transmit, decompress and display digital video images in real time. ('417 Abstract, s. 1)

Real time compression is achieved by sub-sampling each frame of a video signal, encoding and filtering the pixel values to codes, and run-length encoding the codes. ('417 Abstract, s. 2)

Real time transmission is achieved due to high levels of effective compression. ('417 Abstract, s. 3)

Real time decompression is achieved by decoding and decompressing the encoded data to display high quality images. ('417 Abstract, s. 4)

High levels of effective compression also reduce the storage space requirement for recorded video. ('417 Abstract, s. 5)

Written Description
GENERAL PURPOSE COMPRESSION FOR VIDEO IMAGES (RHN) ('417 1:1-2)

CROSS-REFERENCE TO RELATED ('417 1:4-4)

APPLICATIONS ('417 1:5-5)

Also, the processes can each be implemented as a hardware apparatus that will improve the performance significantly. ('417 20:58-59)

Thus the scope of the invention should be determined by the appended claims and their legal equivalents, and not solely by the examples given. ('417 20:60-62)

Fig. 8B

Multi-Pat2Corpus™ for "Video" in
United States Patents 7,016,417, 7,526,029 with Pat2Cite™ Citations

| Prior Context | Term | Subsequent Context | Citation |
|---|---|---|---|
| General purpose compression for | video | Images (RHN) | '417 Patent Title, '029 Patent Title |
| Methods, medium, and machines which compress, encode enhance, transmit, decompress, and display displayable | video | , categories of interest and the user's display preferences of each category. | '417 Abstract s.1, '029 Abstract s.1 |
| Real time compression is achieved by sub-sampling each frame of a | video | signal, encoding and filtering the pixel values to codes, and run-length encoding the codes. | '417 Abstract, s. 2 |
| Real time compression is achieved by sub-sampling each frame of a | video | signal, matching the illumination intensity value representing each pixel with a line number, incrementing a repeat counter, and encoding a repeat data structure with the repeat counter and line number data structure with the line number forming a compressed stream of data. | '029 Abstract, s. 2 |
| 25. A machine for decompressing a stream of encoded data that represents a video signal, comprising: (a) an input/output device for reading said stream of encoded data; (b) a decoding circuit coupled to the input/output device and configured to decompress said stream of encoded data according to the method of claim 16, and generate one or more images, each comprising a plurality of pixel values; and (c) a memory coupled to the decoding unit and configured to store said one or more images to be displayed as frames of a | video | sequence | '029 Claim 25, 25:33-44 |

Fig. 11

Multiple Pat2Cite™ for United States Patents 7,016,417; 7,526,029 / 1802
/ 804

Summary / 810a
/ 812a
United States Patent 7,016,417, Roman; Kendyl A., entitled "General purpose compression for video images (RHN)," filed December 22, 1999, issued March 21, 2006, (the "'417" or "'417 Patent")

United States Patent 7,526,029, Roman; Kendyl A., entitled "General purpose compression for video images (RHN)," filed November 15, 2005, issued April 28, 2009, (the "'029" or "'029 Patent")

Title / 810b
/ 812b
General purpose compression for video images (RHN) ('417 Title, '029 Title)
1814b
Abstract / 810c
/ 1816a

.....United States Patent 7,016,417
/ 812c
Methods, medium, and machines which compress, encode, enhance, transmit, decompress and display digital video images in real time. ('417 Abstract, s. 1, '029 Abstract, s. 1)
1814c
Real time compression is achieved by sub-sampling each frame of a video signal, encoding and filtering the pixel values to codes, and run-length encoding the codes. ('417 Abstract, s. 2)

Real time transmission is achieved due to high levels of effective compression. ('417 Abstract, s. 3)

Real time decompression is achieved by decoding and decompressing the encoded data to display high quality images. ('417 Abstract, s. 4)

High levels of effective compression also reduce the storage space requirement for recorded video. ('417 Abstract, s. 5, '029 Abstract, s. 5)
/ 1816b

.....United States Patent 7,526,029
/ 812d
Real time compression is achieved by sub-sampling each frame of a video signal, matching the illumination intensity value representing each pixel with a line number, incrementing a repeat counter, and encoding a repeat data structure with the repeat counter and line number data structure with the line number forming a compressed stream of data. ('029 Abstract, s. 2)
1814d
Real time transmission of video images is achieved due to high levels of effective compression. ('029 Abstract, s. 3)

Real time decompression is achieve by decoding and decompressing the encoded data to display high quality images. ('029 Abstract, s. 4)

25. A machine for decompressing a stream of encoded data that represents a video signal, comprising: (a) an input/output device for reading said stream of encoded data; (b) a decoding circuit coupled to the input/output device and configured to decompress said stream of encoded data according to the method of claim 16, and generate one or more images, each comprising a plurality of pixel values; and (c) a memory coupled to the decoding unit and configured to store said one or more images to be displayed as frames of a video sequence. ('029 Claim 25, 25:33-44)

Fig. 12

METHODS AND DATA STRUCTURES FOR MULTIPLE COMBINED IMPROVED SEARCHABLE FORMATTED DOCUMENTS INCLUDING CITATION AND CORPUS GENERATION

RELATED APPLICATION

This application is a continuation-in-part of U.S. application Ser. No. 12/586,130, filed Sep. 16, 2009 now U.S. Pat. No. 8,433,708, published on Apr. 15, 2010 as U.S. patent application publication 2010/092088, entitled "METHODS AND DATA STRUCTURES FOR IMPROVED SEARCHABLE FORMATTED DOCUMENTS INCLUDING CITATION AND CORPUS GENERATION," which is incorporated herein by reference.

U.S. application Ser. No. 12/586,130 claims priority under 35 U.S.C. §199(e) of U.S. provisional application Ser. No. 61/192,169, filed Sep. 16, 2008, entitled "METHODS AND DATA STRUCTURES FOR IMPROVED SEARCHABLE FORMATTED DOCUMENTS INCLUDING CITATION AND CORPUS GENERATION," which is incorporated herein by reference.

FIELD OF THE INVENTION

This invention relates to multiple combined improved searchable formatted electronic documents and analysis tools, such as combined citation and corpus generation. Examples of documents include patents, patent applications, evidence files, and other documents which are available in graphic form and optionally also available in a text form.

BACKGROUND OF THE INVENTION

In the field of electronic document management there are many situations where a document is stored as a photographic or scanned graphic of the actual document. For example, in a litigation document management system example documents may represent evidence, reports, court orders, patent documents, etc. The graphic image of the page is critical in many cases and needs to be preserved. However, there is also a need to electronically search the document. Additionally, there has been a long felt need to be able to cut the text from a document and have an accurate internal citation, or location identification, automatically pasted into a new document (e.g. report, brief, etc.) with the text that was cut. In litigation, having analysis, reports, and arguments error free is very important and a significant amount of time spent creating quotes and internal citations and then in checking them to ensure accuracy. Moreover, some documents have a lineage over time that is represented by separate documents. This lineage may be for update or correction reasons where content is added, changed or deleted or it may be for progression reasons where the subject is moved forward. With patents, for example, a lineage may comprise subsequent patent applications which are divisions, continuations or continuations-in-part.

What is needed is a way to analyze documents in its graphic format and then be able to generate quotations with accurate internal citations. Also in patent analysis, for example, what also is needed is a way to thoroughly review all occurrences of certain terms in context to be able to thoroughly and accurately determine the meaning of those terms. Also what is needed is a way to correlate similar documents and provide multiple internal citations across those documents.

SUMMARY OF THE INVENTION

The current invention provides the ability to produce searchable annotated formatted documents by correlating multiple documents stored as a photographic or scanned graphic representations of an actual document (evidence, report, court order, etc.) with textual version of the same documents. A produced document will provide additional details using data structure(s) that would support the above described citation annotation as well as other types of analysis of a document. The data structures also support generation of combined citation and combined corpus reports.

Objects and Advantages

Accordingly, beside the objects and advantages described above, some additional objects and advantages of the present invention are:

1. To provide a quicker and more effective method analyzing documents.
2. To provide a highly accurate, electronically searchable document from graphic images of the document pages.
3. To provide means and methods of document analysis that are easy to use.
4. To reduce the cost of document analysis.
5. To reduce the cost of evidence analysis.
6. To improve the thoroughness of documents analysis.
7. To improve the thoroughness of patent claim term analysis.
8. To identify inconsistencies in the use of document terms, e.g. usage of disputed patent claim terms.
9. To track changes over multiple related documents.
10. To track additions over multiple related documents.
11. To track deletions over multiple related documents.
12. To track the lineage over multiple related documents.
13. To provide citations that are comprehensive over multiple related or similar documents.

BRIEF DESCRIPTION OF THE DRAWINGS

FIG. 7B illustrates an embodiment of a word corpus.

FIG. 8A illustrates the generation of a citation report.

FIG. 8B illustrates an embodiment of a citation report.

FIG. 11 illustrates an embodiment of a combined word corpus.

FIG. 12 illustrates an embodiment of a combined citation report._

REFERENCE NUMERALS IN DRAWINGS

Figure 1A:
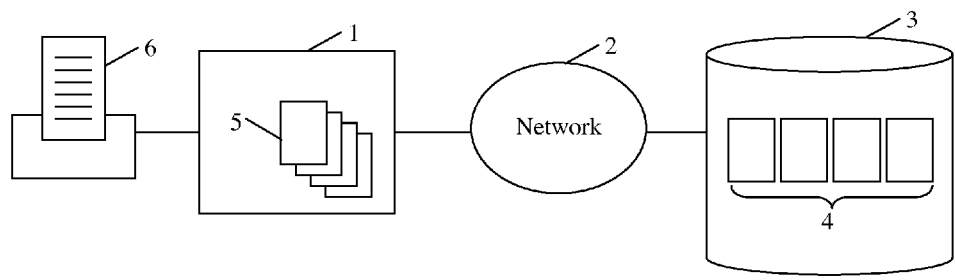
FIG. 1A illustrates a process by which remote documents are obtained and collected and then subsequently converted to other formats.

| | |
|---|---|
| 1 | local computer |
| 2 | network |
| 3 | remote computer |
| 4 | network accessible file collection |
| 5 | converted file |
| 6 | output device |
| 10 | graphic images |
| 20 | text file |
| 30 | formatted document |
| 40 | searchable formatted document |
| 50 | corrected formatted document |
| 60 | searchable annotated formatted document |
| 62 | parse routine |
| 64 | correlate and correct routine |
| 66 | attach data routine |
| 68 | tag words and sentences routine |
| 71 | relative fields |
| 72 | citation fields |
| 73 | part fields |
| 74 | section fields |
| 75 | text for sentences fields |
| 76 | doc ID field |
| 80 | text field |
| 81 | sequential paragraph number |
| 82 | sequential sentence number |
| 83 | new paragraph start |
| 84 | citation start column # field |
| 85 | citation start line # field |
| 86 | citation start word # field |
| 87 | citation end column # field |
| 88 | citation end line # field |
| 89 | citation end word # field |
| 90 | part field |
| 91 | section field |
| 92 | specification part |
| 98 | doc ID field |
| 102 | OCR page # |
| 104 | OCR column # |
| 106 | OCR line # |
| 108 | OCR line coordinates |
| 110 | OCR new paragraph start |
| 112 | OCR line font size |
| 114 | OCR line text |
| 116 | OCR line top coordinate |
| 118 | OCR line bottom coordinate |
| 120 | OCR line left coordinate |
| 122 | OCR line right coordinate |
| 200 a | first (text) data structure |
| 200 b | second (meta-data) data structure |
| 200 | data structure(s) |
| 302 | read text |
| 304 | determine document parts |
| 306 | determine document sections |
| 308 | determine new paragraphs |
| 310 | determine paragraph types |
| 312 | apply relative numbers to each section |
| 314 | read text output |
| 316 | determine parts output |
| 318 | determine sections output |
| 320 | determine new paragraph output |
| 322 | determine paragraph type output |
| 324 | re-apply relative numbers to each section |
| 326 | read searchable formatted document |
| 328 | assemble lines |
| 330 | allocate lines to columns |
| 332 | calculate line numbers |
| 334 | read searchable formatted document output |
| 336 | assemble lines output |
| 338 | allocate lines to columns output |
| 402 | read text file |
| 404 | read searchable formatted document |
| 406 | match text |
| 408 | determine column line and word values |
| 410 | contains figures? |
| 412 | determine figure # and item # |
| 414 | contains claims? |
| 416 | determine claim and clause # |
| 420 | read text file output |
| 422 | read searchable formatted document output |
| 424 | match text output |
| 426 | determine column line and word values output |
| 428 | determine figure # and item # output |
| 500 | start |
| 502 | more documents? |
| 504 | obtain citation for document |
| 506 | get sentence |
| 508 | match any stored? |
| 510 | update stored with citation |
| 512 | add new stored entry |
| 514 | done with document? |
| 520 | report? |
| 522 | generate report |
| 524 | end |
| 600 | concordance program |
| 602 | concordance |
| 700 | corpus program |
| 702 | word or phrase corpus |
| 704 | word or phrase corpus title |
| 710 | prior content column |
| 712 | word (or phrase) column |
| 714 | subsequent content column |
| 716 | citation column |
| 720 | heading row |
| 722 | corpus sample row 1 |
| 724 | corpus sample row 2 |
| 728 | corpus last sample row |
| 800 | citation program |
| 802 | citation document |
| 804 | citation document title |
| 810 (a-d) | citation document section title |
| 812 (a-d) | citation sentence |
| 814 (a-d) | citation annotation |
| 900 a-c | citation program |
| 910 a-c | published document |
| 920 a-c | citation data structure |
| 930 | multiple compare program |
| 940 | combined data structure |
| 950 | report |
| 1702 | combined corpus |
| 1716 | combined citation column |
| 1802 | combined citation document |
| 1814(a-d) | combined citation annotation |
| 1816(a-b) | citation document patent section title |

SPECIAL DEFINITIONS corpus—a collection of recorded statements used as a basis for the descriptive analysis of language in a written document concordance—an index of the important words used in a written document annotation—extra information which is not normally displayed, such as citation information from a data structure that provides citations for text cut from a formatted document citation—an internal reference to the location/position of text within a document combined citation—a list of multiple citations for the similar text over multiple documents

DETAILED DESCRIPTION OF THE INVENTION

FIG. 1A illustrates a process by which remote documents are obtained and collected and then subsequently converted to other formats. Local computer 1 connects to a remote computer 3 via a network 2. Then it accesses file data from the network accessible file collection 4 and retrieves the desired files onto the local computer 1 over the network 2. Once on the local computer 1, the files can be converted into a single converted file 5. Once converted, the file can be output to a peripheral device 6, such as a display or a printer (as shown).

For example, the United States Patent and Trademark Office (USPTO) has a service which provides patent publications as TIFF files, one file for each page.

A patent related embodiment performs the following steps:
a) Input a patent number
b) Access the USPTO World Wide Web site over the Internet to obtain the HTML version of a patent and to use that HTML to determine the number of pages represented by graphic images (e.g. TIFF)
c) Download each page's graphic image
d) Convert the collection of graphic images into a single document (e.g. PDF or multipart TIFF).
e) Optically recognize (via OCR) the page graphic images. Alternatively, each page's graphic image can be processed on the fly (e.g. recognized as each is downloaded in step c above).

These steps could be implemented in computer software. Example embodiments include an Acrobat plug-in or a World Wide Web browser plug-in. Good results have also been obtained implementing these steps as a script running on a group of computers including one computer running an OCR engine (such as OmniPage, TextBridge, or other commercially available OCR engine) and another computer running an Oracle database.

A novel improvement in the system illustrated in FIG. 1A is that an HTML (or plain text) version of the same subject matter can be used to correct spelling in an OCR document created from graphic page images (e.g. using Acrobat OCR capture). For example, in the embodiment for U.S. patents, the USPTO also provides an HTML version of the patent which can be used to correct and correlated the OCR text. It is well known that OCR is not 100% perfect and human comparison and correction is costly. This aspect of the system can significantly improve the value of searchable documents created by OCR.

Once the graphic images are converted (and optionally corrected), the document 5 can be printed, for example on printer 6.

Figure 1B:
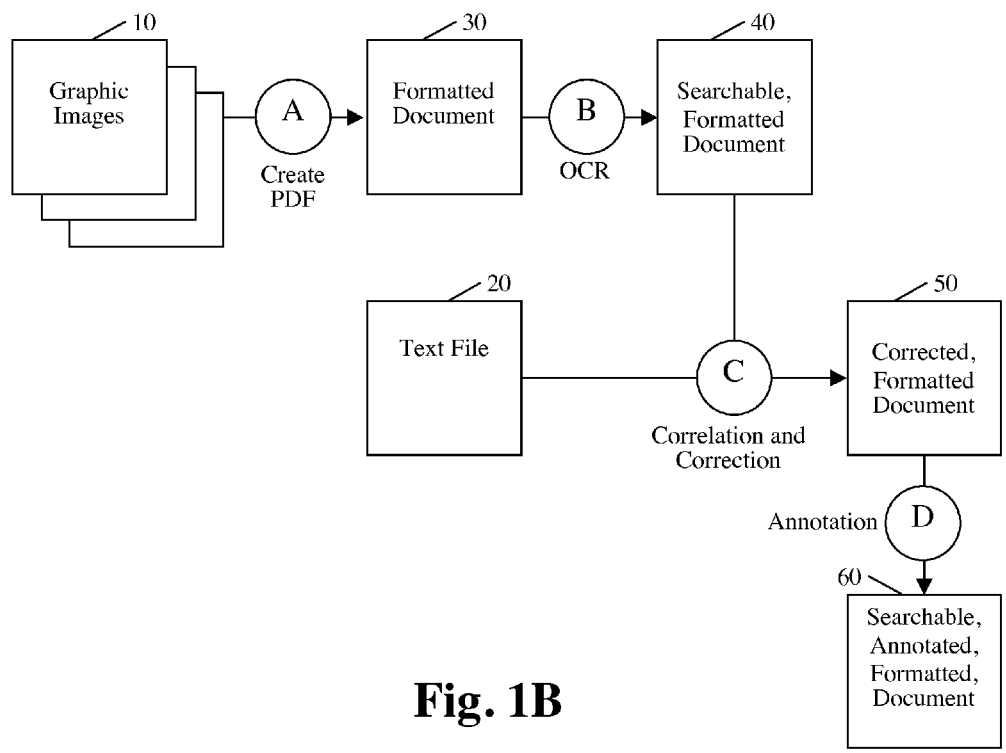
FIG. 1B illustrates a process by which a searchable annotated formatted document is produced.

FIG. 1B illustrates production of a searchable annotated formatted document 60. The U.S. patent example will be used to illustrate this aspect of the system. The USPTO provides a graphic image 10 for each page of a published patent. These graphic images 10 (e.g. TIFF files) are not text searchable (they are like photographs). A formatted document 30, such as an Adobe Acrobat PDF, can be created as a binder holding every graphic image 10 (routine A). See also FIG. 1A. The formatted document 30 (e.g. PDF file) can be processed with OCR (routine B) to convert the images to searchable text forming a searchable formatted document 40. Alternatively, an OCR engine can provide structured data which describes the text elements found in the document with the graphic location of each element, and which can be used instead of searchable formatted document 40. The USPTO also provides a text file 20 in HTML format for many patents. The text file 20 is electronically searchable. The searchable formatted document 40 is correlated with the text file 20 to correct the OCR text (routine C) resulting in a corrected formatted document 50.

The corrected formatted document 50 is a valuable tool for analysis.

Further, the corrected formatted document 50 can be used to add various annotations (routine D) to produce a searchable annotated formatted document 60. "Annotated" is not used in the general sense as would be understood by one of skill in the art. The word is used here in a new limited way to refer to the annotations from the data structure(s) 200 that provide the internal citations for quotes pasted from the searchable annotated formatted document 60. Again using the U.S. patent example, the searchable annotated formatted document 60 version of a patent can be used as the primary analysis document in a patent litigation or evaluation. When an expert or attorney wants to refer to a particular section of the patent, the user simply selects the desired words and a highly accurate quote and citation, including for example, column and line numbers, is automatically generated and can be pasted into a report or brief.

Figure 2A:
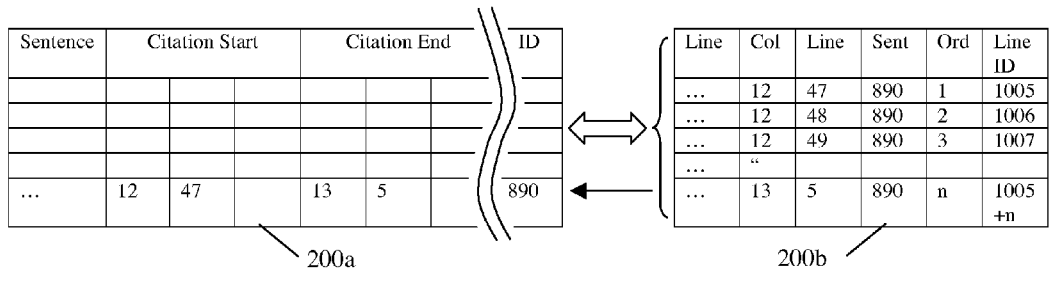
FIG. 2A illustrates data structures that are used to verify, correlate and correct meta-data data, for example, patent OCR data.

FIG. 2A illustrates data structures that are used to verify, correlate and correct document data, for example, patent OCR data. The data structures 200 can be implemented in various ways. Good results have been obtained by implementing them as Microsoft Excel spreadsheets, perl data structures, XML files, or Oracle database data tables.

The first data structure 200a generally contains each unit with information used to provide an internal citation, e.g. "('498 patent 12:47-13:5)". An example of a unit would be a sentence or a title. This data is substantially obtained from the HTML (or text version of the document) and may contain estimated values. In one embodiment, a spreadsheet document (such as Microsoft Excel) with functions is used to estimate the citations (to improve correlation ease or accuracy).

The second data structure 200b generally contains each line (or column line). Each column line has only one column and/or line number associated with it. This data preferably comes from OCR data (but may be input by people).

The data between these two structures are correlated with a unique ID for each entry in the tables. The sentence data has an ID for each sentence. The column line data has an ID for each line. The line data is matched, if possible, to each sentence's unique ID and give a sentence a relative ordinal number. The actual citation data, such as start column, start line, end column, and end line, is filled in the first data structure 200a based on matching first and last line data. The OCR text is corrected by verification against the HMTL data. Missing data in the data structure is flagged and estimates are used.

Figure 2B:
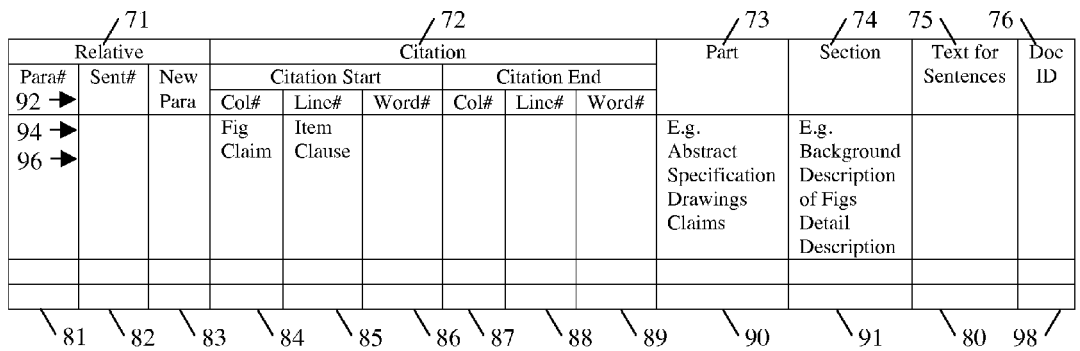
FIG. 2B illustrates an embodiment of a text data structure.

FIG. 2B illustrates an exemplary text data structure 200a that holds information that will be used to provide the citations for quotes pasted from the searchable annotated formatted document 60 or citations on a word or phrase corpus 702. The text data structure 200a also provides an alternative output that can be used independently from the formatted documents (30, 40, 50 or 60). The text data structure 200a is first instantiated by a parsing routine (FIG. 3) and updated by a correlation and correction routine (FIG. 4).

Figure 2C:
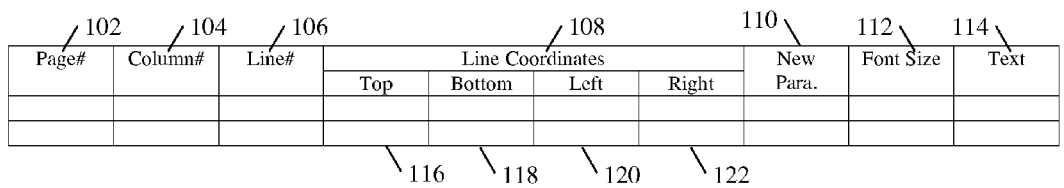
FIG. 2C illustrates an embodiment of a meta-data data structure.

FIG. 2C illustrates an exemplary meta-data data structure 200b that holds information that will be used to as an interim repository for the data parsed from the searchable formatted document 40, or alternatively obtained from OCR.

Figures 3A, 3B:
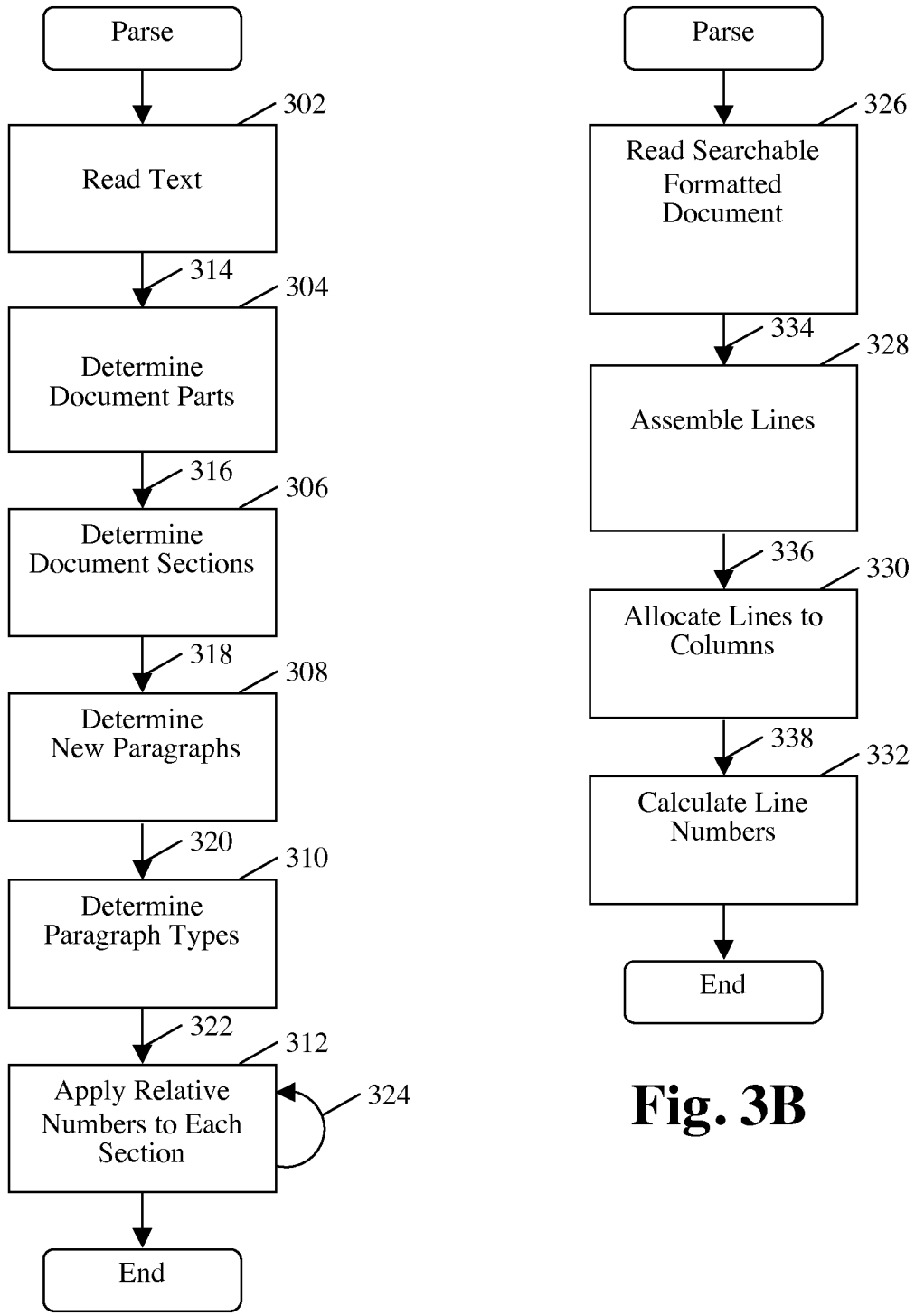
FIG. 3A illustrates a text parse routine.
FIG. 3B illustrates a searchable formatted document parse routine.
Figure 4:
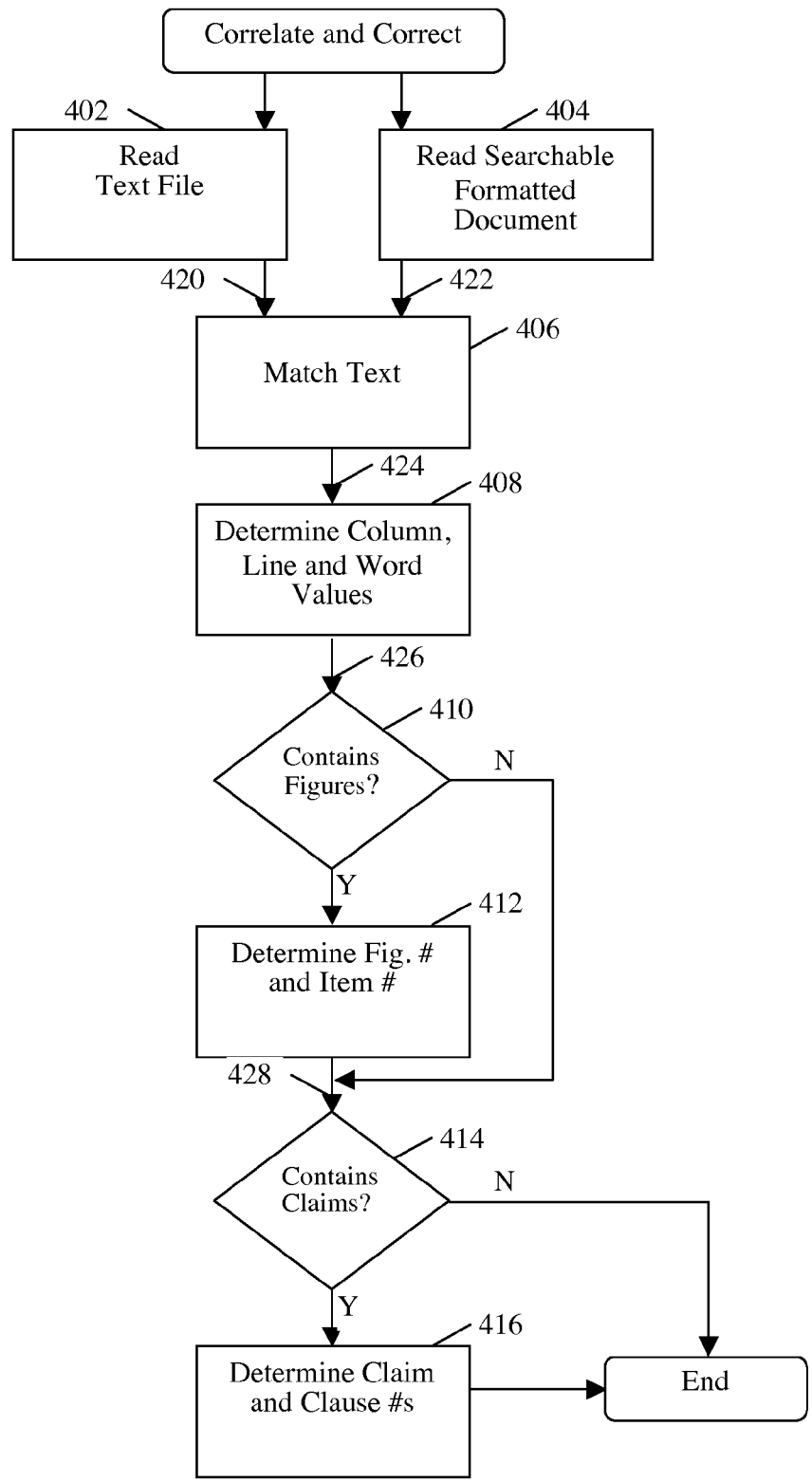
FIG. 4 illustrates a correlate and correct routine.

FIG. 3A illustrates a text parse routine (which could be implemented in Perl, for example) which reads the text from the text file 20 or another source of text (step 302). It determines the document parts (step 304). For example, in a U.S. patent embodiment, parts could be one of Abstract, Drawing, Specification, or Claims. Then it determines document sections (step 306). For example, in a U.S. patent embodiment, document sections include Background of the Invention, Summary of the Invention section, and so forth. Then it determines new paragraphs (step 308). Then it determines paragraphs types (step 310). For example, regular paragraph text, tables, equations, etc. In step 312, the text data structure 200a in FIG. 2B would be filled in except for the citation fields (72). The text for each heading or sentence would be filled in the text field (80). Relative numbers would be filled in, for example in the specification part (92), each paragraph would be assigned a sequential paragraph number (81) and sequential sentence number (82). Sentence numbers would restart at 1 for each paragraph. In addition, any new paragraph starts (83) would be identified. In the patent drawings, for example, any text from the figures would be indexed. In the claims, each clause would be relative to the claim. The part fields (73, 90) and the section fields (74, 91) would be filled in.

At this point the text data structure 200a (without the citations) has an alternative use. It can be used to produce a text version of the subject document (e.g. patent) with numbered paragraphs (e.g. for electronic filing) e.g. "[103] Referring to FIG. 1B . . . ."

FIG. 3B illustrates the searchable formatted document parse routine (which could be implemented in Perl, for example) which reads the searchable formatted document 40 (step 326). Then it takes the words and assembles the lines (step 328). Then it allocates each line to either the left or right column (step 330). Then it calculates the line numbers for each line (step 332). At this point, the meta-data data structure 200b in FIG. 2C would be filled in completely.

Figure 5:
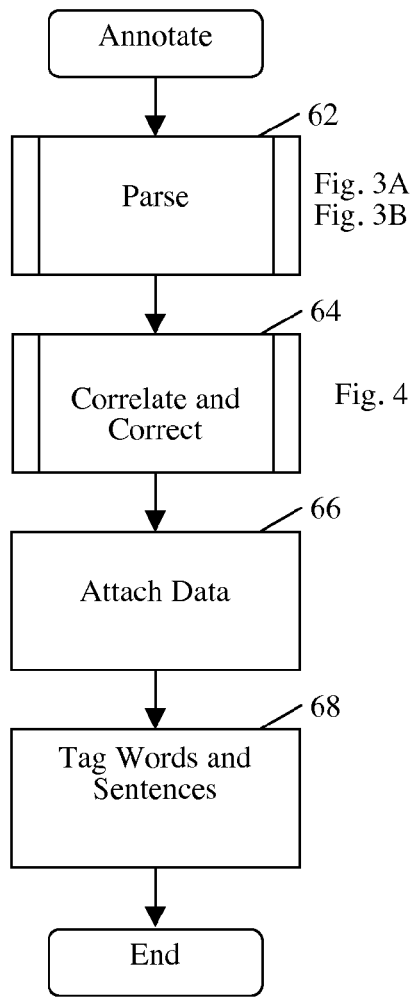
FIG. 5 illustrates an annotation routine.

FIG. 5 illustrates the annotation routine which is an implementation of routine D in FIG. 1B. First the text (20 or 50) is parsed by the parse routine 62 (e.g. using the text parse routine shown in FIG. 3A) and the searchable formatted document parse routine (e.g. see FIG. 3B). Next the text data structure 200a is updated with correlation and correction information by the correlate and correct routine 64. For example, see FIG. 4.

The correlation information in the patent example would be the citation column, line and word numbers for the start and end of each sentence. The end could be optional because, for example, it could be determined by looking at the next record's start. The next step is to attach the data (e.g. FIG. 2B) by the attach data routine 66 to the document. In some embodiments, the data would be meta-data that is not normally viewable in normal display modes. In other embodiments, the data in each record could be stored as a user displayable "annotation" (in the general sense) at the user's option. In other embodiments, the data is simply appended to the end of the document e.g. as a table.

Next the words and/or sentences are tagged by the tag words and sentences routine (68) in the formatted document so that when a portion is cut or copied, the citation associated with the text is cut or copied with it. Special software associated with the document viewer would handle the "cut" and/or "copy" operation. For example, in PDF or FrameMaker or Microsoft Word a plug-in could be added (either by the publisher or as a 3$^{rd}$ party plug-in) to provide text plus the citation (e.g. "U.S. Pat. No. 8,888,523 17:40-18:3") in the paste buffer.

Note that step 68 in FIG. 5 could be optional because the plug-in could use the attached data (step 66) to provide the citation in the paste buffer. However, by tagging the documents, the determination of the citation for a particular set of words is more straightforward at the time of the cut and/or copy operation.

FIG. 4 illustrates an example of the correlate and correct step 64 of FIG. 5. A text file 20 is read (step 402). A searchable formatted document 40 is read (step 404). The order of steps 402 and 404 is not significant, and may be performed in parallel. In step 406, the text file 20 in the form of the text data structure 200a is compared with a searchable formatted document 40 in the form of the meta-data data structure 200b. The relative text is matched to the positional information in the graphic version of the same document to determine page or column number, line number, and word number (92) or the line (step 408). If the document contains figures (decision 410), then the figure numbers and item numbers (94) are determined in step 412. If the document contains claims (decision 414), then the claim numbers and clause numbers are also determined in step 416. Thus the correlation routine updates the text data structure 200a (FIG. 2B) with the start (and optionally end) citation information 72 (84-89).

Figure 6:
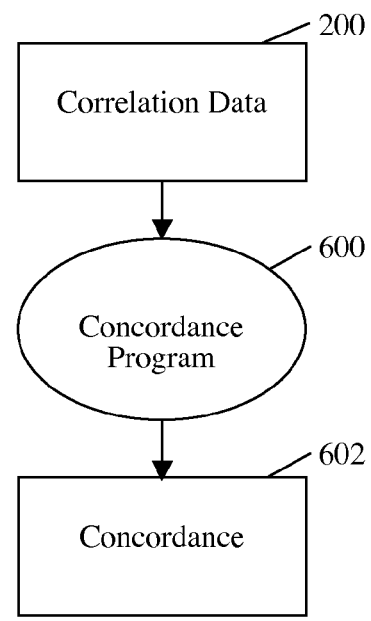
FIG. 6 illustrates generation of a concordance.
Figure 7A:
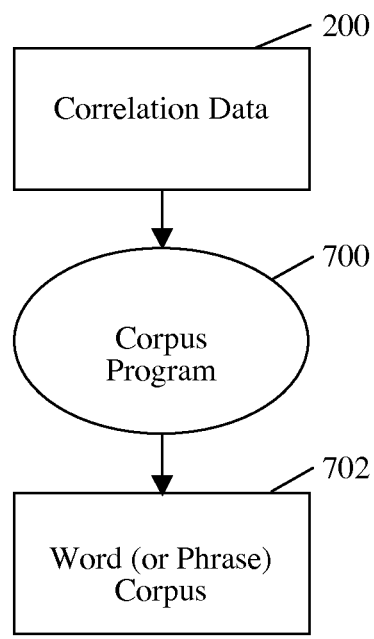
FIG. 7A illustrates generation of a word corpus.

If the document or page has a document ID (e.g. a BATES number), it is added in (76, 98). After the correlate and correct routine (e.g. for example, see FIG. 4) is complete the data structure can be used in many ways including but not limited to:

1. Annotation of the corrected formatted document 50 to form the searchable annotated formatted document 60.
2. Production of a spreadsheet containing each text element and citation where by a reader can find text in the spreadsheet by electronically searching and quickly find the internal citation or location of the text in a paper version.
3. Input to a concordance program 600 that identifies each occurrence of a word or phrase and produces a concordance 602 with each sentence with the specified word or phrase and its citation (FIG. 6).
4. Input to a corpus program 700 that identifies each occurrence of a word or phrase and produces a corpus 702 with each sentence and with the specified word or phrase and its citation (FIG. 7A). FIG. 7B shows an embodiment of word or phrase corpus 702. In an alternate embodiment, FIG. 11 shows a combined word or phrase corpus 1702 (discussed below).
5. Input to a citation program 800 that produces a citation document 802 with each sentence and with its citation (FIG. 8A). FIG. 8B shows an embodiment of a citation document 802. In an alternate embodiment, FIG. 12 shows a combined citation document 1802 (discussed below).

Note the word "corpus" generally means "entire body." In the context of the field of language analysis it refers to a collection of recorded utterances used as a basis for the descriptive analysis of a language. In the context of this invention the word "corpus" (as well as "concordance") is limited to the language used in a single document (e.g. a patent) or a small group of related documents (e.g. a set of related patents with common inventorship or subject matter).

The corpus 702 could be corpus for a single word or phrase i.e. a "word corpus" or for all the words in the document i.e. a "document corpus" or for a set of key words (e.g. a) similar to those selected for a concordance, or b) a set of disputed terms). This invention is not limited to patent analysis. It is also useful for analysis of other evidence, such as e-mail, source code, contracts, discovery documents, Web pages, contracts, etc.

The methods for:
generating a corrected formatted document 50 (e.g. FIG. 1B),
generating a searchable annotated formatted document 60 (e.g. FIG. 1B),
generating a concordance 602 (e.g. FIG. 6),
generating a corpus 702 (e.g. FIG. 7A), and
generating a citation document 802 (e.g. FIG. 8A),
generating a combined corpus 1702 (e.g. FIG. 11), and generating a combined citation document 1802 (e.g. FIG. 12), can each be implement on a web site enabled by a database for storing the correlation data and various generated documents.

The correlation data structure 200 contains corrected text and internal citations for each sentence in published document, such a patent or patent application, or similar document. When two or more such publications have any common text, the two or more data structures 200 for each respective document can be compared.

Figure 9:
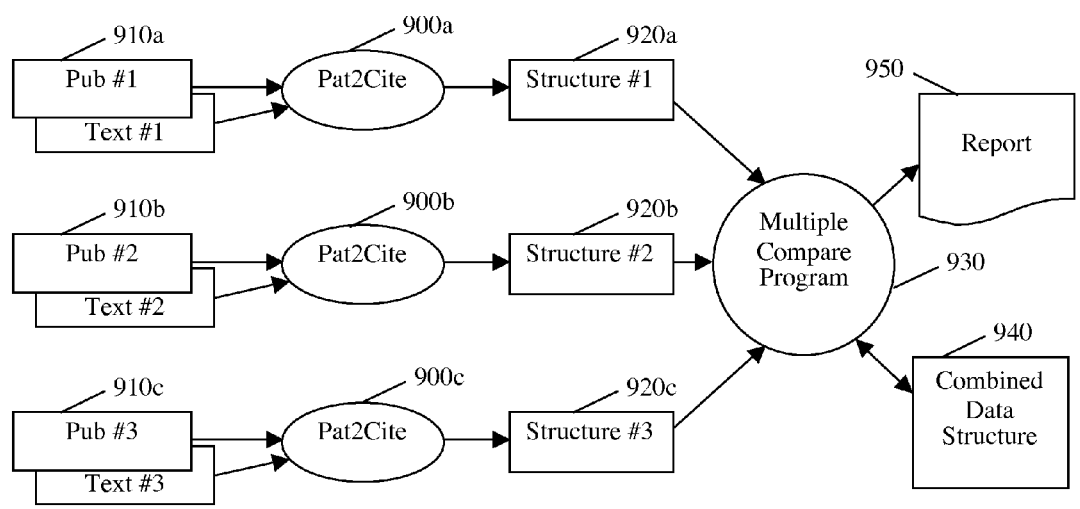
FIG. 9 illustrates a high-level multiple document comparison and report generation diagram.

In FIG. 9, first a citation program 900 (*a-c*) is run for each published document 910 (*a-c*) (i.e. Pub #1, Pub #2, . . . . Pub #N) and correlated text file producing a citation data structure 920 (*a-c*) (i.e. Struct #1, Struct #2, . . . Struct #N) for each respective formatted document. (See FIG. 10 steps 502 and 504).

Citation programs 900 (*a-c*) are embodiments of citation program 800. Citation data structures 920 (*a-c*) are embodiments of the data structures 200.

Once two or more data structures are available, the multiple compare program 930 compares each sentence entry in a first input sentence data structure 920*a* to each sentence entry in a second input sentence data structure 920*b*. (See FIG. 10 step 508). When sentences match, the matched sentence is stored in an output combined data structure 940 along with both citations. (See FIG. 10 step 510). Sentences that don't match will be discussed later.

Next, any remaining or new input data structures (e.g. 920*c* and so forth) are compared against the combined data structure 940 and added until all N inputs have been processed. (See FIG. 10 step 514). For sentences that are the same in all inputs, the finished data structure will contain the sentence plus each internal citation.

The matched sentences can be output in a multi-citation report 950 (see FIG. 10 step 522), for example, as:

"The stool comprises a seat connected to three legs." ('123 8:5-6, '234 8:5-6, '789 9:20-22)

During the above processing, if a sentence doesn't match, in one embodiment, it will be stored as a sentence with only its citation. (See FIG. 10 step 512.) For example, if the first two instances match, but third, forth, and fifth subsequent instances have been modified there will be two entries. In one embodiment, the multiple citation report 950 would be, for example:

"The stool comprises a seat connected to three legs." ('123 8:5-6, '456 8:6-7)

"The stool comprises a wooden seat connected to three legs which are round as shown in FIG. 3A." ('234 8:5-7, '789 9:20-23, '790 9:20-23)

The multiple citation report 950 is an embodiment of a citation document 802, namely multiple citation document 1802.

The combined data structure 940 could be used in embodiments of any process that uses the data structure 200 as input, such as a concordance program 600 (FIG. 6) or corpus program 700 (FIG. 7), or citation program 800 (FIG. 8A).

In another embodiment, the multiple citation report 950 could show the difference between each version. The difference could be indicated by using different colors, by underlines and cross outs, by italics and bold, by symbols, by popups, or by callouts. For example, "The stool comprises a wooden seat connected to three legs which are round as shown in FIG. 3A." ('234 8:5-7, '456 8:6-7, '789 9:20-23, '790 9:20-23)

As in the citation process discussed above in regard to FIG. 1B, the citation data can be embedded in a searchable PDF document so that when a section is cut, the citation data is pasted with the section. Each original formatted document 910 (i.e. Pub #1, Pub #2, . . . , Pub #N) could be annotated with the collective data from the combined data structure 940.

The embedded multiple citations are displayed in a popup when the selection is made or when the cursor is over the sentence.

Figure 10:
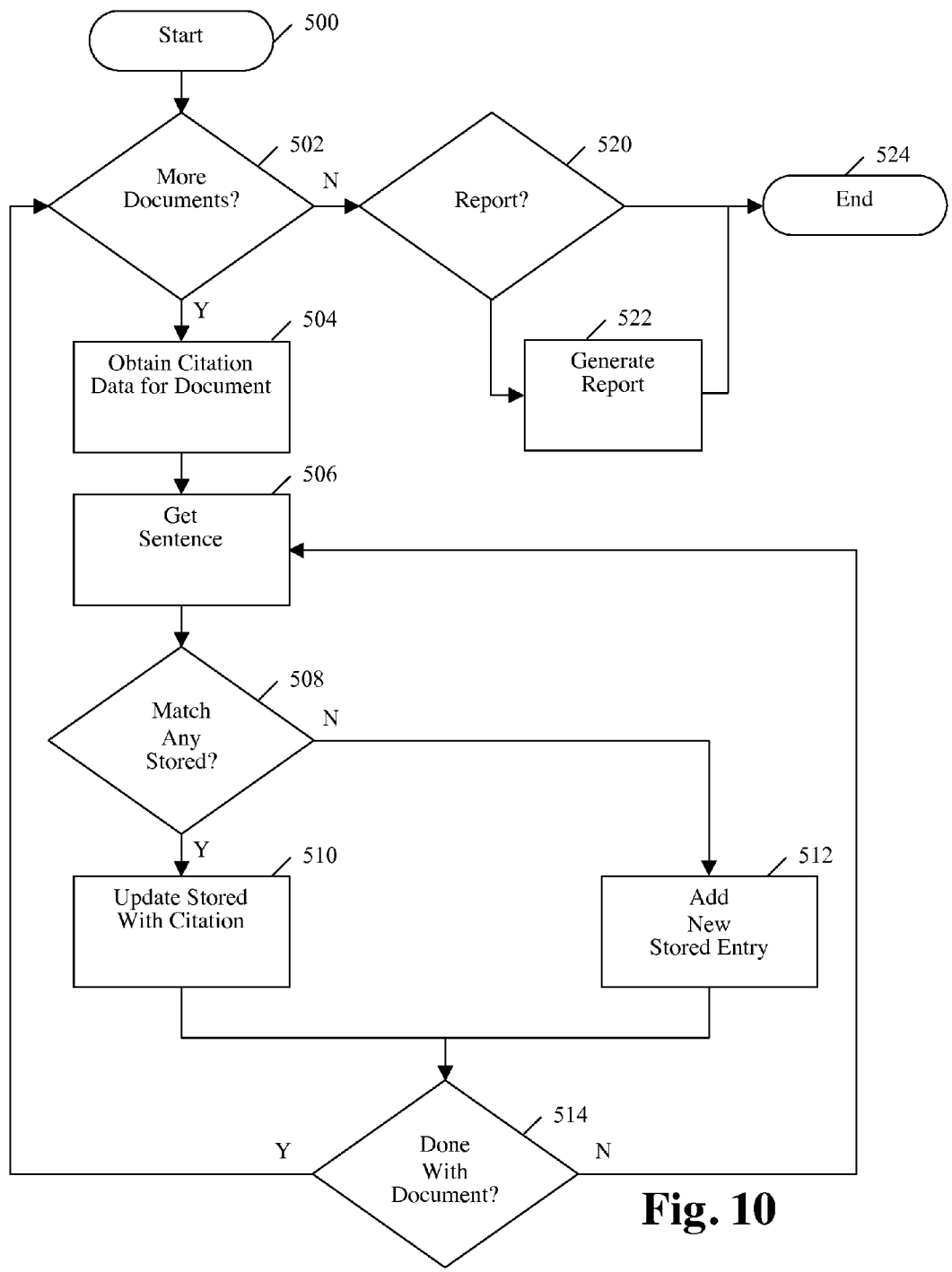
FIG. 10 illustrates a detailed multiple document comparison and report generation flow chart diagram.

FIG. 10 is a flow chart showing an exemplary embodiment of the method just described. The method begins at start 500. If there are documents yet to be processed (at more documents? decision 502) the citation data 920 is obtained for the current document at step 504. At get sentence step 506, data for a current sentence is obtained from the respective citation data structure 920. Then, the current sentence text is checked to see if matches any stored sentence data in the combined data structure 940 at decision 508. If there is a match, the stored data in the combined data structure 940 is updated with the citation for the current sentence at step 510. If the current sentence does not match the stored data, then a new entry is added to the combined data structure 940 at step 512. If the data for the current document is done, at decision 514 flow returns to the more documents 502 decision; otherwise, flow returns to the get sentence data step 506.

If at decision 502, there are no more documents, flow continues to decision 520. If a report is needed, a multiple citation report 950 is generated at step 522.

In yet another embodiment, duplicated sentences in a single document could be cited with multiple citations the first time it occurs.

In still yet another embodiment, duplicated sentences in any of the multiple documents 910 could be cited with multiple citations the first time it occurs.

These combined data structures 940 and the multi-cited formatted searchable document 950 will be very valuable in analyzing documents with common lineage. The reports will save time for highly paid attorneys and experts and will allow judges and juries to see the true nature of complex document families.

FIG. 11 illustrates an embodiment of the combined word corpus 1702. This embodiment illustrates the use of the combined data structures 940 generated in FIG. 9 to create a combined word corpus for multiple documents (such as patents as shown in these examples). The word or phrase corpus title 704 displays the multiple documents considered for this corpus. In addition, a combined citation column 1716 is used instead of the citation column 716 in FIG. 7B. The combined word corpus 1702 is an embodiment of corpus 702 having multiple citations in the combined citation column 1716.

FIG. 12 illustrates a combined citation report 1802. This embodiment illustrates the use of the combined data structure 940 generated in FIG. 9 to create a combined citation report 950 for multiple documents (such as patents in these examples). The citation document title 804 displays the multiple documents considered for this report. Also, a combined citation annotation 1814 is used instead of the citation annotation 814 in FIG. 8B. In addition, one or more citation document patent section titles 1816, each representing a document, appear within each citation document section title 810 delineating the content related or found initially in the document the citation document patent section title 1816 relates to.

Advantages

Searchable

Text searches can be performed within the document or across multiple documents.

Copy and Paste Citation

Each sentence in the document can be copied and pasted into other documents. The internal citation for each sentence (or group of sentences) is copied and pasted along with the sentence.

Original Document Format Maintained

The original format of the document is maintained after it has been converted to a searchable format.

Identify Location in Original Document

As formats in the text file 20 may differ from the original formatted document 30, it is important that the annotations or citations correlate with each sentence and/or line and/or heading to identify its relative location with a document.

Accuracy

Optical Character Recognition (OCR) systems have struggled for decades to improve accuracy. OCR does very poorly on some documents. Further, for some situations, such as an expert witness report or Federal Court brief, errors can have severe impact on the perception of the facts in the case and ultimately cost millions of dollars. The present invention provides a way to improve accuracy of the computer generated data as well as improve the accuracy of human construction of reports and briefs.

Thorough

The concordance and corpus features of present invention provide a means for through analysis of every instance of a word or phase, or related phrases, in a document of related set of documents. For example, in a patent case, the corpus documents on disputed claim terms will not only make claim term analysis more efficient, but will also ensure that all usage is considered and inconsistencies are understood. The use of corpus reports will improve the rigorousness of claim term analysis and provide judges with stronger input upon which to base their judgments.

Cost Saving

The present invention provides several aspects that will save time and improve the performance of highly paid experts, analysis, and attorneys. Thus, significant savings will result from use of the present invention.

Lineage Changes

The present invention provides several aspects that will facilitate the ability to track changes, additions and deletions over multiple related documents over time namely comprehensive citations.

Consolidation

The correlated citations allow for similar data to be consolidated. The multiple citations provide complete reference. Minor changes are highlighted. This consolidation results in less space being taken up in reports, while maintaining comprehensive disclosure. This saves time and paper, and, in the case of patent analysis, results in more accurate understanding.

CONCLUSION, RAMIFICATION, AND SCOPE

Accordingly, an aspect of the present invention provides searchable annotated formatted documents that are produced by correlating documents stored as a photographic or scanned graphic representations of an actual document (evidence, report, court order, etc.) with textual version of the same documents. A produced document will provide additional details in a data structure that supports citation annotation as well as other types of analysis of a document. The data structure also supports generation of citation reports and corpus reports. A method aspect includes creating searchable annotated formatted documents including citation and corpus reports by correlating and correcting text files with photographic or scanned graphic of the original documents. Data structures for correlating and correcting text files with graphic images are valuable output by themselves. Another method aspect includes generation of citation reports, concordance reports, and corpus reports. Data structures provide for citation reports, concordance reports, and corpus reports generation.

While the above descriptions contain several specifics these should not be construed as limitations on the scope of the invention, but rather as examples of some of the preferred embodiments thereof. Many other variations are possible. For example, although U.S. patent data has been used in the examples, the document system could be applied to other categories of documents. Some embodiments would target specific types of documents. The routines could be implemented in hardware or using various software platforms. Additionally, the system could have additional features, or be used in different countries without departing from the scope and spirit of the novel features of the present invention.

Accordingly, the scope of the invention should be determined not by the illustrated embodiments, but by the appended claims and their legal equivalents.

I claim:

1. A non-transitory computer readable medium encoded with program instructions which are executed by a computer to provide a method of generating internal citations for a plurality of formatted documents, the instructions comprising the steps of:
   a) obtaining graphic representations of each page of a current one of the formatted documents,
   b) optically recognizing characters on each page of the current formatted document, and determining the position of the characters on each page,
   c) obtaining a separate and distinct text version of the current formatted document,
   d) parsing text from the text version, the parsed text being separate and distinct from the recognized characters,
   e) correlating the recognized characters with the parsed text to determine an internal citation for each sentence, wherein the internal citation identifies the document and a citation location inside the document where the corresponding sentence is found, wherein the citation location comprises one or more of:
      i) an internal citation page number;
      ii) an internal citation column number;
      iii) an internal citation line number;
      iv) an internal citation paragraph number; and
      v) an internal citation sentence number, and
   f) repeating steps a) through e) for each of the remaining formatted documents,
   g) creating a document citation data structure storing data determined in the correlating step for each of the plurality of formatted documents.

2. The computer readable medium of claim 1 further the comprising the steps of:
   h) comparing a plurality of document citation data structures each associated with a respective one of the plurality of formatted documents,
   i) combining citation data for sentences that are the same in two or more of the plurality of formatted documents to form a multiple citation data structure.

3. The computer readable medium of claim 2 further comprising a step of:
   attaching the multiple citation data structure to one of the plurality of formatted documents, wherein, when a portion of text is copied from the one of the plurality of formatted documents, corresponding multiple internal citations are included with the copied portion.

4. The computer readable medium of claim 3 further comprising a step of:
tagging words and sentences,
whereby the internal citations associated with the copied portion is directly linked to copied portion.

5. The computer readable medium of claim 3 wherein the attaching step yields a searchable annotated formatted document.

6. The computer readable medium of claim 1 wherein the multiple citation data structure comprises citation start data, comprising a document identifier, a start column number, and a start line number.

7. The computer readable medium of claim 6 wherein the multiple citation data structure comprises citation end data, comprising an end column number and an end line number.

8. The computer readable medium of claim 1 wherein the multiple citation data structure comprises at least one of the group of:
a) internal citation page number,
b) internal citation paragraph number, and
c) internal citation sentence number.

9. The computer readable medium of claim 1 wherein the parsing the text step further includes at least one of the group of:
a) determining document parts, said document parts each comprising a distinct group of pages,
b) determining document sections, said document sections each comprising a distinct group of paragraphs, under one or more headings,
c) determining new paragraphs, and
d) determining paragraph types.

10. The computer readable medium of claim 1 wherein the determining the position of the characters substep further includes at least one of the group of:
a) assembling lines,
b) allocating lines to columns, and
c) calculating line numbers.

11. The computer readable medium of claim 1 wherein the correlating step further includes at least one of the group of:
a) determining column numbers, and
b) determining line numbers.

12. The computer readable medium of claim 1 wherein at least one formatted document contains drawing figures, and
wherein the correlating step further includes at least one of the group of:
a) determining figure numbers in the drawing figures, and
b) determining figure item numbers in drawings figures.

13. The computer readable medium of claim 2 wherein at least one formatted document is a patent related publication, and
wherein the correlating step further includes both:
a) determining claim numbers, and
b) determining clause numbers.

14. The computer readable medium of claim 2 further comprising a step of:
generating a multiple citation document using the multiple citation data structure.

15. The computer readable medium of claim 1 further comprising a step of:
using the parsed text to correct the recognized characters, yielding a corrected formatted document.

16. The computer readable medium of claim 2 further comprising a step of:
generating a corpus report using the multiple citation data structure, the corpus report comprising rows comprising:
a) prior context,
b) a word or phrase,
c) subsequent context, and
d) an internal citation.

17. The computer readable medium of claim 16 wherein the corpus report is based on a single word root.

18. The computer readable medium of claim 16 wherein the corpus report is based on a phrase.

19. The computer readable medium of claim 16 wherein the corpus report is based on a set of related words.

20. A non-transitory computer readable medium encoded with program instructions which are executed by a computer to provide a method of generating internal citations for a plurality of formatted documents, the instructions comprising the steps of:
a) obtaining graphic representations of each page of a current one of the formatted documents, wherein the current formatted document is a patent,
b) optically recognizing characters on each page of the current formatted document, and determining the position of the characters on each page,
c) obtaining a separate and distinct text version of the current formatted document,
d) parsing text from the text version, the parsed text being separate and distinct from the recognized characters,
e) correlating the recognized characters with the parsed text to determine an internal citation for each sentence, wherein the internal citation identifies the document and a citation location inside the document where the corresponding sentence is found, wherein the citation location comprises:
i) an internal citation column number; and
ii) an internal citation line number, and
f) repeating steps a) through e) for each of the remaining formatted documents,
g) creating a document citation data structure storing data determined in the correlating step for each of the plurality of formatted documents.

* * * * *